Nov. 1, 1938.   L. G. HOWLETT   2,134,759
COOKING UTENSIL
Filed Jan. 14, 1938
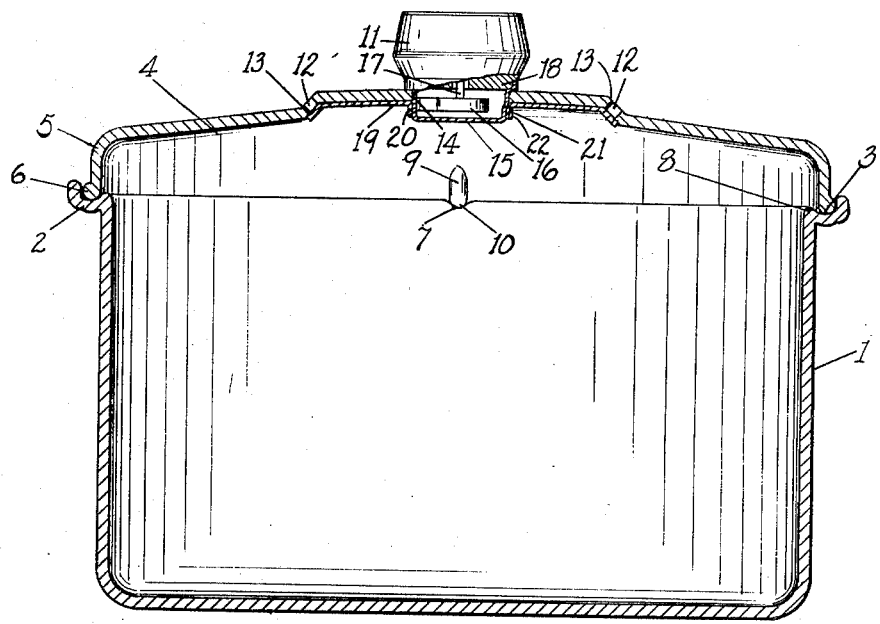
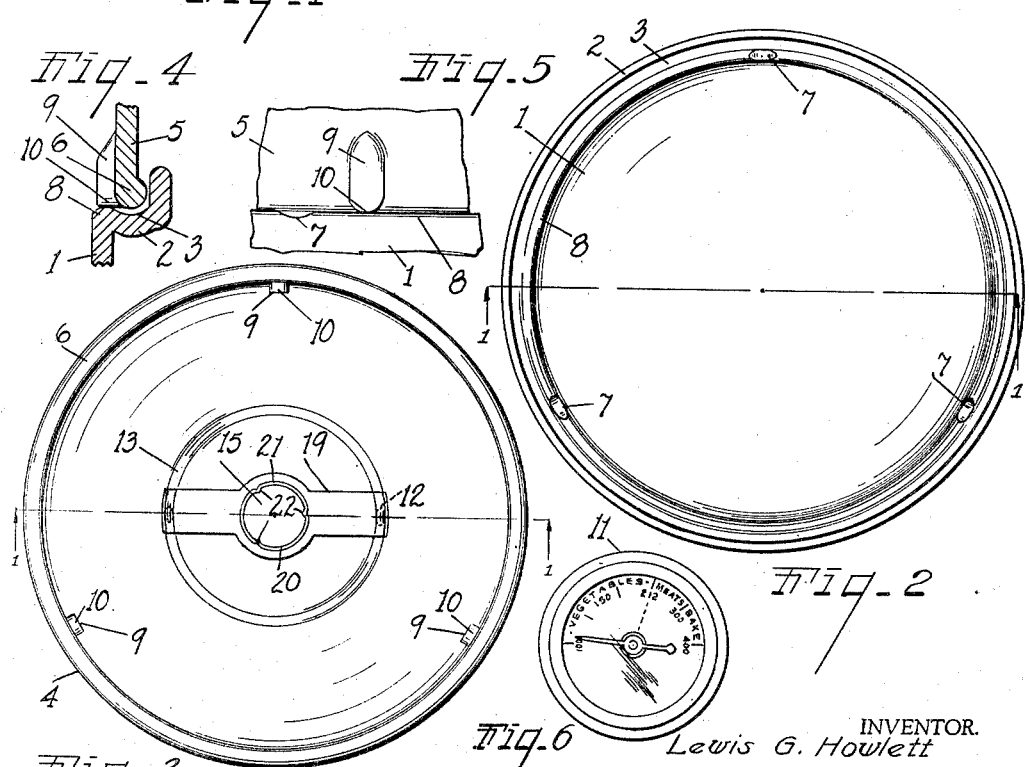
INVENTOR.
Lewis G. Howlett
BY Carl & Chappell
ATTORNEYS Patented Nov. 1, 1938

2,134,759

UNITED STATES PATENT OFFICE 2,134,759

COOKING UTENSIL

Lewis G. Howlett, Hartford, Mich., assignor to Cookware Company of America, Hartford, Mich.

Application January 14, 1938, Serial No. 184,936

7 Claims. (Cl. 53—1)

The main objects of my invention are:

First, to provide a cooking utensil having provision for setting up a suitable circulation of air within the same during the initial stages of the cooking operation whereby to vent off certain volatile acid gases detrimental to the proper preparation of the food.

Second, to provide a utensil of the type described, comprising a vessel and cover therefor having provisions for the admission of air between the same, in combination with novel provisions for venting off gases through the cover.

Third, to provide a cooking utensil having the venting provisions described in combination with a thermometer to visually indicate the heat condition within the utensil.

Fourth, to provide a utensil having a cover provided with a handle and a thermometer mounted therein in a novel and improved manner.

Fifth, to provide a utensil cover having vent openings therein controllable by a handle, the handle being likewise utilized as a mounting for a heat indicating device.

Further objects relating to details and economies of my invention will definitely appear from the description to follow. The invention is defined in the claims.

A structure embodying the features of my invention is illustrated in the accompanying drawing, in which:

Fig. 1 is a view illustrating my utensil, being in vertical section on a line corresponding to line 1—1 in Figs. 2 and 3.

Fig. 2 is a top plan view of the vessel or bottom part of my utensil.

Fig. 3 is a bottom plan view of the cover of my utensil.

Fig. 4 is an enlarged fragmentary view in vertical section illustrating the relation of the cover and vessel, in the elevated position of the former relative to the latter according to the provisions of my invention.

Fig. 5 is an enlarged fragmentary view in elevation more clearly illustrating the structure of Fig. 4 as seen from the inside of the vessel and cover.

Fig. 6 is a detail view of the thermostat dial and indicator.

It is now generally recognized by housewives and chefs as being desirable to maintain as much as possible the color of cooked fruits and vegetables, not only because of the enhanced appearance of the same, but also because of the fact that the presence or absence of the original color of the fruit or vegetable in general indicates the presence or absence of certain nutritive elements in the food.

It is further generally recognized that all or practically all vegetables contain certain acids which when liberated by heating detrimentally affect the color and flavor and destroy to a certain degree certain of the vitamins in the foods unless the said volatile acid gases are oxidized or allowed to escape. It is therefore the general object of this invention to provide a cooking utensil which enables the satisfactory cooking of fruits and vegetables by oxidizing and venting off the undesirable volatile acids in the latter and at the same time maintaining the color thereof. More particularly, the present invention concerns itself with means for effecting these functions in a novel and improved manner and in arranging air admission and gas venting means whereby the objects are attained in a novel manner, there being heat indicating means likewise mounted on the utensil in a novel and improved manner as will be hereinafter more particularly described.

As illustrated, my invention is embodied in a cooking receptacle or vessel 1 which may be in the form of a stew pan, pot, kettle or other well known type of cooking vessel. This receptacle has an outwardly projecting rim flange 2 formed with an upwardly facing annular groove 3 therein. The reference numeral 4 indicates a cover for the utensil, having a downturned annular side wall 5 of substantial height provided with a beaded edge 6 snugly fitting within the upwardly facing groove 3 so as to provide a substantially sealed joint between the cover and receptacle when the cover is adjusted to completely closed position as illustrated in Fig. 1.

The receptacle 1 and cover 4 are preferably formed of an aluminum alloy or alloy castings. However, it will be evident from the description to follow that my improvements are independent of the material utilized for the utensil and the same may be molded or cast of copper, brass, iron, or of sheet metal or of other suitable material. Likewise, although I have not illustrated the same, a suitable handle may be provided for the receptacle 1.

My invention contemplates the provision of means whereby an annular opening for the admission of air may be provided at will by the user between receptacle 1 and cover 4. To this end, I provide the receptacle with a plurality of notches or rounded grooves 7 uniformly spaced around and on the inner wall 8 constituting a side of the annular groove 3. On the cover I provide a similar number of uniformly spaced radial projections or rounded lugs 9 the bottoms 10 of which are flush with the lowermost edge of bead 6. These lugs are illustrated as being integral with the cover, this being the most practical and sanitary manner of forming the same. However, if desired, they may be in the form of individual elements secured to the cover in the proper spaced relation by any suitable means. The said lugs are adapted to rest on top of the portion 8 of the receptacle wall in one position, as illustrated in Fig. 4, to space the cover slightly from the receptacle throughout the major portion of the periphery thereof and thereby break the sealing joint between the cover and receptacle. This provides a relatively small but adequate annular orifice or port for the admission of ventilating air which will flow over the contents of the receptacle. This draft of cold air is effective to drive off the previously described volatile acid gases through controllable vent means in the cover to be hereinafter described.

I provide cover 4 with a handle or knob generally indicated 11, in the central top portion thereof and between a pair of vent ports 12 in the cover. The said ports are located in an annular tapered offset or step 13 in the cover whereby the ports extend radially to direct the vapors and gases outwardly and prevent undue heating of the handle 11.

I preferably mount handle 11 rotatably in a central aperture 14 in the cover provided to receive the handle. This handle is formed of a hollow thimble 15 having rotatable bearing in aperture 14. Thimble 15 provides a housing for a heat responsive element 16 secured to a shaft 17 appropriately mounted in the handle and bearing at its upper end a pointer (not shown). The said pointer cooperates with a suitably calibrated dial or scale within the knob portion 18 of handle 11, which knob portion is fixedly secured to thimble 15. Handle 11 has a transparent cover whereby the thermometer may be viewed to ascertain the temperature of the contents of the utensil. (See Fig. 6.) The details of the thermometer per se form no part of my invention and are therefore not illustrated further, since the only aspect of my invention relating to the thermometer concerns the mounting of any suitable heat indicating device within a handle rotatable in a cover.

In order to selectively control the opening and closing of the outlet ports 12, I employ a valve plate 19. This plate is centrally apertured at 20 and has a downturned flange 21 adapted to lockingly engage thimble 15 by the indenting or upsetting of the flange into the thimble at spaced points 22, as illustrated in Fig. 3. Plate 19 may be brought into or out of closing relation to ports 12 by manipulation of handle 11 whereby to vent off the gases through the cover in a manner which will be apparent, or to completely or partially close ports 12 as desired. Suitable stops limiting the angular movement of the valve plate may be provided.

It will be observed that valve plate 19 serves two functions, namely, the primary function of controlling the opening through ports 12 and the secondary function of maintaining handle 11 in proper rotatable position on the cover through its fixed engagement with thimble 15. Such an arrangement gives a maximum economy of materials and makes for ease of manufacture and assembly. Furthermore, the construction of a handle having heat indicating means permanently and sealingly mounted therein makes it possible to thoroughly wash the cover after each use without the danger of rendering the thermometer means inoperative due to clogging of the parts, rusting, etc.

It will be perceived that the provisions of the present invention result in a utensil capable of being thoroughly vented through the initial stages of cooking so as to remove at once the objectionable volatile gases and accordingly eliminate the deleterious effect thereof and that throughout the remaining stages of the cooking operation the degree to which steam and other gases or vapors are vented from the utensil is readily and effectively controllable either by bringing the cover to full sealing position as illustrated in Fig. 1 or to partial sealing position as illustrated in Figs. 4, 5 or by opening or closing ports 12 or by a combination of the procedural steps mentioned. The mounting of the thermometer indicating means in the handle in conjunction with the adjustable valve plate 19 is a further important aspect of my invention either when regarded by itself or in combination either with the provisions for an annular admission of air and the venting of gases described. A convenient and accurate indication of the heat condition of the contents is furnished thereby along with means for readily and quickly altering said condition in accordance with the information so derived.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a utensil consisting of a receptacle and a cooperating cover, in combination, means for ventilating the interior of the utensil comprising a plurality of ports in said cover adapted when open to exhaust vapors and gases from said interior, means for admitting air annularly to the interior, comprising a series of uniformly spaced lugs on the cover, said receptacle having similarly spaced recesses adapted to receive the lugs, relative rotation of the cover and receptacle serving to bring the lugs and grooves out of alinement whereby to elevate the cover and form an annular passage thereneath, means for controlling the opening through said ports comprising a rotatable valve plate, and means for rotatably mounting said plate on the cover and for securing the plate in rotatably mounted position, comprising a handle rotatably mounted in the cover and secured to the plate.

2. In a utensil of the type described having receptacle and cover portions, in combination, means on said portions for elevating the cover relative to the receptacle by relative rotation of said portions to provide an annular air admission passage between the portions in one relative position thereof and to seal said passage in another position thereof, means for centrally venting vapors and gases through the cover, comprising a valve plate rotatably mounted on the cover, said cover having an angularly disposed portion provided with a plurality of radially directed vent ports controlled by said plate, a handle rotatably mounted on the cover centrally thereof, and means for connecting said plate to the handle whereby to rotatably actuate the plate and secure the same in mounted position.

3. In a utensil of the type described having receptacle and cover portions, in combination, means on said portions for elevating the cover relative to the receptacle by relative rotation of said portions to provide an annular air admission passage between the portions in one relative position thereof and to seal said passage in another position thereof, means for venting vapors and gases through the cover, comprising a valve plate rotatably mounted on the cover, said cover having a plurality of vent ports controlled by said plate, a handle rotatably mounted on the cover, and means for connecting said plate to the handle whereby to rotatably actuate the plate.

4. In a utensil of the type described having receptacle and cover portions, in combination, means on said portions for elevating the cover relative to the receptacle by relative rotation of said portions to provide an annular air admission passage between the portions in one relative position thereof, and means for venting vapors and gases through the cover, comprising a valve plate rotatably mounted on the cover, said cover having a plurality of vent ports controlled by said plate, and a handle rotatably mounted on the cover, said plate being secured to the handle whereby to be rotatably actuated thereby.

5. In a utensil of the type described having cover and receptacle portions, means for admitting air annularly between said portions in one relative position of the portions, and means for selectively venting gases and vapors upwardly and centrally through the cover, comprising an apertured valve plate rotatably mounted on the cover, the cover having a plurality of ports controlled by said apertured plate, and a handle rotatably mounted in the cover centrally thereof, said plate being secured to the handle interiorly of the cover and actuated thereby.

6. In a utensil of the type described having cover and receptacle portions, means for admitting air annularly between said portions in one relative position of the portions, and means for selectively venting gases and vapors upwardly and centrally through the cover, comprising a valve plate rotatably mounted on the cover, the cover having a plurality of ports controlled by said plate, and a handle rotatably mounted in the cover centrally thereof, said plate being secured to the handle and actuated thereby.

7. In a utensil of the type described having cover and receptacle portions, means for admitting air annularly between said portions in one relative position of the portions, and means for selectively venting gases and vapors upwardly and centrally through the cover, comprising a valve plate rotatably mounted on the cover, the cover having a plurality of ports controlled by said plate, and a handle rotatably mounted in the cover, said plate being secured to the handle interiorly of the cover and actuated thereby.

LEWIS C. HOWLETT.